US007594186B2

(12) United States Patent
Bates et al.

(10) Patent No.: US 7,594,186 B2
(45) Date of Patent: *Sep. 22, 2009

(54) DIALOG BOX POSITIONING

(75) Inventors: Cary Lee Bates, Rochester, MN (US); Steven Paul Jones, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 596 days.

This patent is subject to a terminal disclaimer.

(21) Appl. No.: 11/128,797

(22) Filed: May 13, 2005

(65) Prior Publication Data

US 2005/0210407 A1 Sep. 22, 2005

Related U.S. Application Data

(63) Continuation of application No. 09/915,689, filed on Jul. 26, 2001, now Pat. No. 6,971,068.

(51) Int. Cl.
*G06F 3/00* (2006.01)

(52) U.S. Cl. ....................... 715/788; 715/809; 715/811; 715/812; 715/790; 715/802

(58) Field of Classification Search ................. 715/788, 715/809, 811, 812, 790, 802, 808
See application file for complete search history.

(56) References Cited

U.S. PATENT DOCUMENTS

| | | | | |
|---|---|---|---|---|
| 5,060,170 | A | 10/1991 | Bourgeois et al. | |
| 5,140,678 | A | 8/1992 | Torres | |
| 5,204,947 | A | 4/1993 | Bernstein et al. | |
| 5,241,656 | A | 8/1993 | Loucks et al. | |
| 5,283,560 | A | 2/1994 | Bartlett | |
| 5,377,317 | A | 12/1994 | Bates et al. | |
| 5,428,733 | A * | 6/1995 | Carr | 715/809 |
| 5,434,965 | A | 7/1995 | Matheny et al. | |
| 5,491,795 | A | 2/1996 | Beaudet et al. | |
| 5,550,563 | A | 8/1996 | Matheny et al. | |
| 5,581,670 | A | 12/1996 | Bier et al. | |
| 5,590,265 | A | 12/1996 | Nakazawa | |
| 5,598,524 | A | 1/1997 | Johnson, Jr. et al. | |
| 5,608,850 | A | 3/1997 | Robertson | |
| 5,617,114 | A | 4/1997 | Bier et al. | |
| 5,621,878 | A | 4/1997 | Owens et al. | |
| 5,630,080 | A | 5/1997 | Malamud et al. | |
| 5,764,229 | A | 6/1998 | Bennett | |
| 5,805,163 | A | 9/1998 | Bagnas | |
| 5,831,615 | A | 11/1998 | Drews et al. | |
| 5,835,091 | A | 11/1998 | Bailey et al. | |
| 5,841,420 | A | 11/1998 | Kaply et al. | |
| 5,920,315 | A | 7/1999 | Santos-Gomez | |
| 6,002,397 | A | 12/1999 | Jaaskelainen, Jr. | |
| 6,717,589 | B1 * | 4/2004 | Grillo et al. | 715/715 |

* cited by examiner

*Primary Examiner*—Tadesse Hailu
*Assistant Examiner*—Michael Roswell
(74) *Attorney, Agent, or Firm*—Patterson & Sheridan, LLP

(57) ABSTRACT

Methods, systems and articles of manufacture for enhanced control over the positioning of dialog boxes in relation to hyperlinks within electronic documents. The controlled positioning is implemented to mitigate any undesirable placement of dialog boxes that might limit to user access to hyperlinks contained within the electronic document. Accordingly, embodiments are provided for determining a location within a displayed electronic document at which a dialog box may be positioned without obscuring any hyperlinks. In the event that such positioning is not possible, steps are taken to position the dialog box in a location that will result in the least interference between the user and a displayed document.

8 Claims, 6 Drawing Sheets

DIALOG BOX POSITIONING

CROSS-REFERENCE TO RELATED APPLICATIONS

This application is a continuation of co-pending U.S. patent application Ser. No. 09/915,689, filed Jul. 26, 2001 now U.S. Pat. No. 6,971,068 entitled "DIALOG BOX POSITIONING", which is herein incorporated by reference.

BACKGROUND OF THE INVENTION

1. Field of the Invention

The present invention generally relates to data processing. More particularly, embodiments are provided for determining a position of a dialog box relative to hyperlinks.

2. Description of the Related Art

Hyperlinks are graphical objects in an electronic document that link the document to another electronic document. Documents containing hyperlinks are typically formatted using a standard markup language, such as the Hypertext Markup Language (HTML), and are viewed using a computer software application known as a web or hypertext browser. Hyperlinks have become an extremely popular manner for interfacing with a computer due to its intuitiveness, simplicity and efficiency. With hyperlinks, a user is permitted to navigate between documents and/or between different locations in the same document simply by moving a pointer over a hyperlink and selecting the hyperlink by depressing a key or button (a process known as "pointing and clicking").

In general, hyperlinks may be text (called hypertext links) or images. Hypertext links often include text that is embedded within a text string that is highlighted to identify the text as a hypertext link. As such, a user is often able to navigate by directly selecting the text from a portion of a text string. For example, a text string such as "the winner of the 1973 Kentucky Derby was Secretariat" might have a hypertext link defined for the word "Secretariat", such that a user might be able to view a separate document with Secretariat's career racing statistics simply by pointing and clicking on the word "Secretariat".

A principal use of hyperlinks is in retrieving information from the Internet, and specifically, a portion of the Internet known as the World Wide Web ("the Web"). Moreover, due to the ever-increasing popularity of the Web, many private networks, as well as other applications local to a user's workstation, now use hyperlinks to access and navigate between documents.

However, the convenience of hyperlinks is diminished by obstructions which obscure the link from the view of the user. One such obstruction is a dialog box. Dialog boxes are small graphical boxes that are used within a graphical interface of a computer system to display small amounts of information. Typically, a dialog box contains text and one or more buttons such as an "OK" or "CANCEL" button, and may contain one or more text entry fields. One distinguishing property of dialog boxes is that they pop to the foreground of the user interface in an attempt to immediately gain the user's attention. In some cases, a dialog box may be presented as a result of an event experienced by the browser, such as when a hypertext document cannot be refreshed. Dialog boxes may also result from the processes within the Web page itself. For instance, if the Web page uses Java or Java Script code as part of its implementation, then this code may request that a dialog box be rendered to complete processing.

Dialog boxes can be modal or non-modal. A modal dialog box is one that does not allow any other interaction by the user with the application until the dialog box is responded to by the user. A non-modal dialog box allows the user to continue to interact with the application and neglect the dialog box until a later time. Even where non-modal dialog boxes are used, it is often the case that such a dialog box will be rendered in a position that blocks access to the controls on the Web page that the user desires to interact with. In particular, the box may be blocking hypertext links. When this occurs, the user must at least move the dialog box out of the way. This mitigates much of the advantage gained by using a non-modal dialog, and causes the user to prematurely deal with the dialog box.

Therefore, a need exists for a manner of controlling the placement of dialog boxes over content of an electronic document and in particular, a manner of controlling the placement of non-modal dialog boxes such that document content, such as hyperlinks, remains accessible.

SUMMARY OF THE INVENTION

Embodiments of the present invention provide methods, systems and articles of manufacture for controlling the placement of dialog boxes over content of an electronic document and in particular, for controlling the placement of non-modal dialog boxes such that document content, such as hyperlinks, remains accessible.

One embodiment provides a method of positioning a non-modal dialog box in a graphical user interface (GUI) displaying content comprising hyperlinks. The method comprises determining whether the GUI includes a display area at least equal to an area of the dialog box and absent of any hyperlinks; and if so, displaying the dialog box in the display area.

Another embodiment provides a method of positioning a non-modal dialog box in a graphical user interface (GUI) displaying content comprising hyperlinks. The method comprises processing a request to retrieve the content from a network address; parsing a response to the request; rendering the content in a viewable manner; determining a position for the dialog box and displaying the dialog box in the position. Determining the position comprises at least one of (i) determining whether the dialog box can be positioned in a display area of the GUI where none of the hyperlinks are obscured from a view of a user; and (ii) determining whether the dialog box can be positioned in a display area of the GUI where a least number of hyperlinks are obscured from the view of the user.

Yet another embodiment provides a computer readable medium containing a program which, when executed by a processor, causes operations to position a dialog box in a graphical user interface (GUI) displaying content comprising hyperlinks. The operations comprise determining whether the GUI includes a display area at least equal to an area of the dialog box and absent of any hyperlinks; and if so, displaying the dialog box in the display area.

Still another embodiment provides a computer readable medium containing a program which, when executed by a processor, causes operations to position a non-modal dialog box in a graphical user interface (GUI) displaying content comprising hyperlinks. The operations comprise processing a request to retrieve the content from a network address; parsing a response to the request; rendering the content in a viewable manner; determining a position for the dialog box, and positioning the dialog box. Determining the position comprises at least one of: (i) determining whether the dialog box can be positioned in a display area of the GUI where none of the hyperlinks are obscured by a user; and (ii) determining whether the dialog box can be positioned in a display area of the GUI where a least number of hyperlinks are obscured from the view of the user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
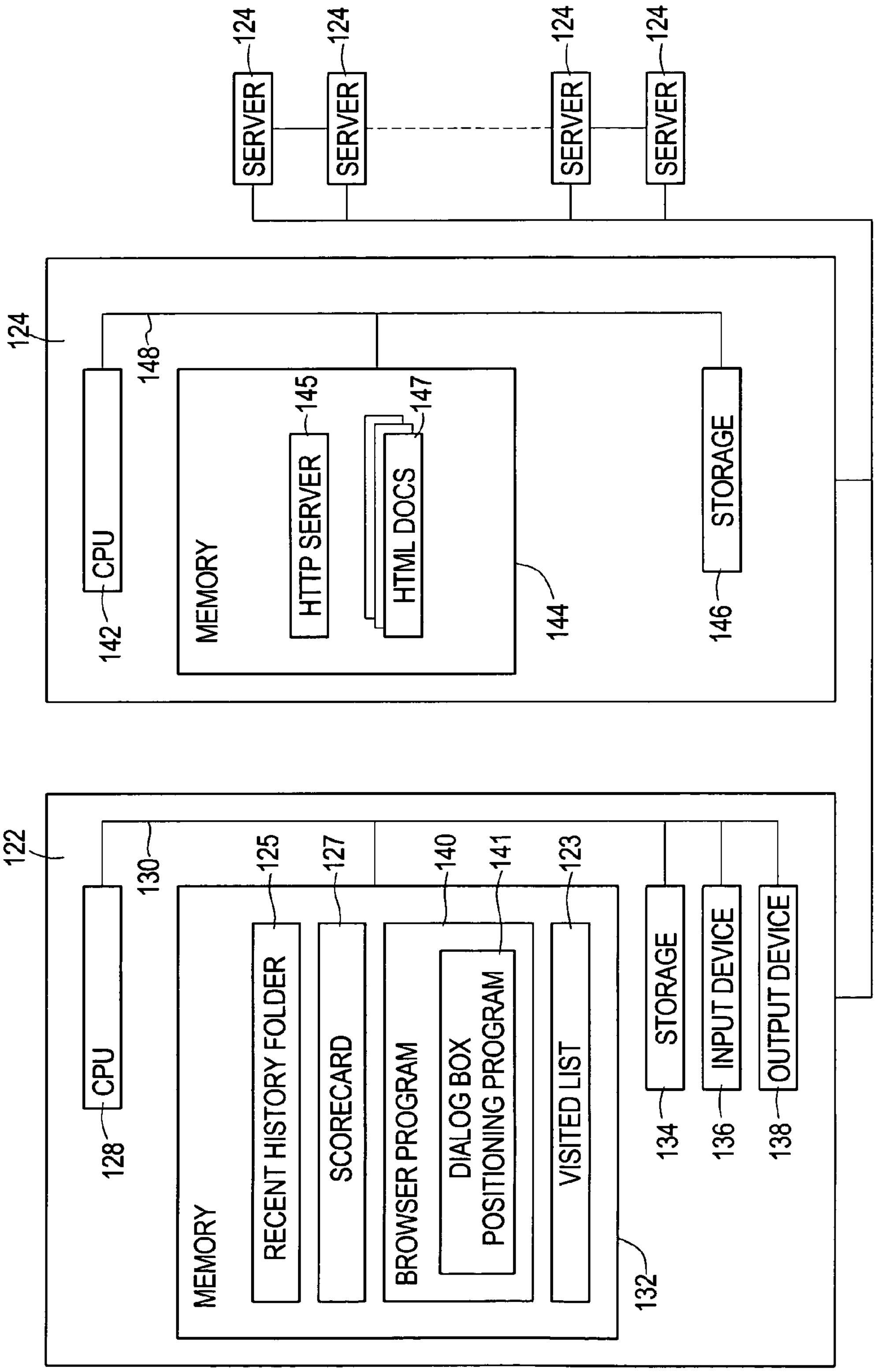
FIG. 1 is a high level diagram of a networked system.

Embodiments of the present invention provide enhanced control over the positioning of dialog boxes in relation to hyperlinks within electronic documents. The controlled positioning is implemented to mitigate any undesirable placement of dialog boxes that might limit user access to hyperlinks contained within the electronic document. Accordingly, a system, a method and an article of manufacture are provided for determining a location within a displayed electronic document at which a dialog box may be positioned without obscuring any hyperlinks. In the event that such positioning is not possible, steps are taken to position the dialog box in a location that will result in the least interference between the user and a displayed document. In general, the steps may be based on statistical probabilities which are sensitive to the navigational path of the user. For instance, if the user has traversed only previously visited links to arrive at the current document, then it is likely that the next link the user will take will also be a previously visited link. As a result, efforts are made to avoid placing the dialog box over any previously visited links within the current document. In one embodiment, placement of the dialog box is also sensitive to criteria such as how frequently and how recently a link is visited.

One embodiment of the invention is implemented as a program product for use with a computer system such as, for example, the data processing system 100 shown in FIG. 1 and described below. The program(s) of the program product defines functions of the embodiments (including the method described below with reference to FIG. 3) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 depicts a data processing system 100 that allows browsing information located at network addresses. Although a specific hardware configuration is shown for data processing system 100, embodiments of the present invention can apply to any hardware configuration that allows the browsing of documents, regardless of whether the computer system is a complicated, multi-user computing apparatus, a single-user workstation, or a network appliance that does not have non-volatile storage of its own. Further, the data processing system 100 may be a local area network (LAN) or a wide area network (WAN), such as the Internet.

In general, the data processing system 100 includes a client computer 122 and at least one server computer 124 (five such servers 124 are shown). The client computer 122 and the server computer 124 may be components of the same computer system or may be separate components connected via a network connection 126. In one embodiment, the network conception 126 comprises the Internet. The client computer 122 includes a Central Processing Unit (CPU) 128 connected via a bus 130 to memory 132, storage 134, input device 136 and output device 138. The input device 136 can be any device to give input to the client computer 122. For example, a keyboard, keypad, light pen, touch screen, button, mouse, track ball, or speech recognition unit could be used. The output device 138 may be any conventional display screen and, although showing separately from the input device 136, the output device 138 and input device 136 could be combined. For example, a display screen with an integrated touch screen, a display with an integrated keyboard, or a speech recognition unit combined with a text speech converter could be used.

Memory 132 is preferably a random access memory sufficiently large to hold the necessary programming and data structures of the invention. While memory 132 is shown as a single entity, it should be understood that memory 132 may in fact comprise a plurality of modules, and that the memory 132 may exist at multiple levels, from high speed registers and caches to lower speed but larger DRAM chips. The memory 132 contains a browser program 140 that, when executed on the CPU 128, provides support for navigating between the various servers 124 and locating addresses at one or more of the servers 124. The contents of memory 132 can be loaded from and stored to the storage 134 as CPU 128 has a need for it.

The program contents of memory 132 include a client navigation program 140 (also referred to as the "browser 140") and a dialog box positioning program 141. The browser 140 can be integrated with the operating system of the client computer 122, or can be a separate application. The browser program 140 may be initiated by a user on the client computer 122 and used to navigate electronic documents. The documents accessible by the browser program 140 may reside on the client computer 122 or on the network of servers 124. For illustration, one embodiment of the invention is described in the context of the distributed system (such as the one shown in FIG. 1) wherein the browser 140 retrieves and renders remotely located electronic documents. After parsing the retrieved documents, the browser 140 may render the documents in a viewable format to a user using the output device 138.

The dialog box positioning program 141 operates to strategically place dialog boxes at locations within an electronic document being viewed on the output device 138. Although shown as a component of the browser program 140, in other embodiments, the dialog box positioning program 141 is separate from the browser program 140.

Memory 132 also contains a plurality of data structures including a visited list 123, a recent history folder 125 and a scorecard 127. In general, the visited list 123 is any data structure configured to contain network addresses (e.g., URLs) which have been previously visited by a user or displayed using the browser 140. This list stores the names of each of the hypertext documents and time they were last accessed, so that when the user encounters a link to this document, they will be informed that they have already visited the document that the link refers to. A detailed description of one embodiment of the visited list 123 is described below with respect to FIG. 2.

While the visited list 123 maintains a long-term record of previously visited sites, the recent history folder 125 tracks sites which have been visited during a current browser session. One example of such a feature which is known in the art is the "GO" menu item provided by Netscape Navigator.

The scorecard 127 provides memory space for storing various values used when executing the dialog box positioning program 141. Illustrative values include a visited threshold, an unvisited threshold, a best score and a current score. One embodiment of the scorecard 127 is described below with respect to FIG. 3.

In the preferred embodiment, storage 134 is DASD (Direct Access Storage Device), although it could be other storage such as floppy disc drives or optical storage. Although storage 134 is shown as a single unit, it could be any combination of fixed and/or removable storage devices, such as fixed disc drives, floppy disc drives, tape drives, removable memory cards, or optical storage. Memory 132 and storage 134 could be part of one virtual address space spanning multiple primary and secondary storage devices.

Each server computer 124 generally comprises a CPU 142, memory 144, and storage 146 coupled to one another by a bus 148. The storage 146 is provided for long-term storage of implementation code and data needed during operation. The memory 144 is random access memory sufficiently large to hold the necessary programming and data structures that are located on the server computer 124 according to a network information address, e.g., a URL. As shown, the memory 144 includes an HTTP server process 145 adapted to service requests from the client computer 122 regarding electronic documents 147. Illustratively, the electronic documents 147 are HTML documents. More generally, the first and second electronic documents 147 may be any electronic documents containing instructions that can be rendered by the browser 140. Although shown residing on the same server 124, the electronic documents 147 may be located on separate servers 124. The programming and data structures may be accessed and executed by the CPU 142 as needed.

Figure 2:
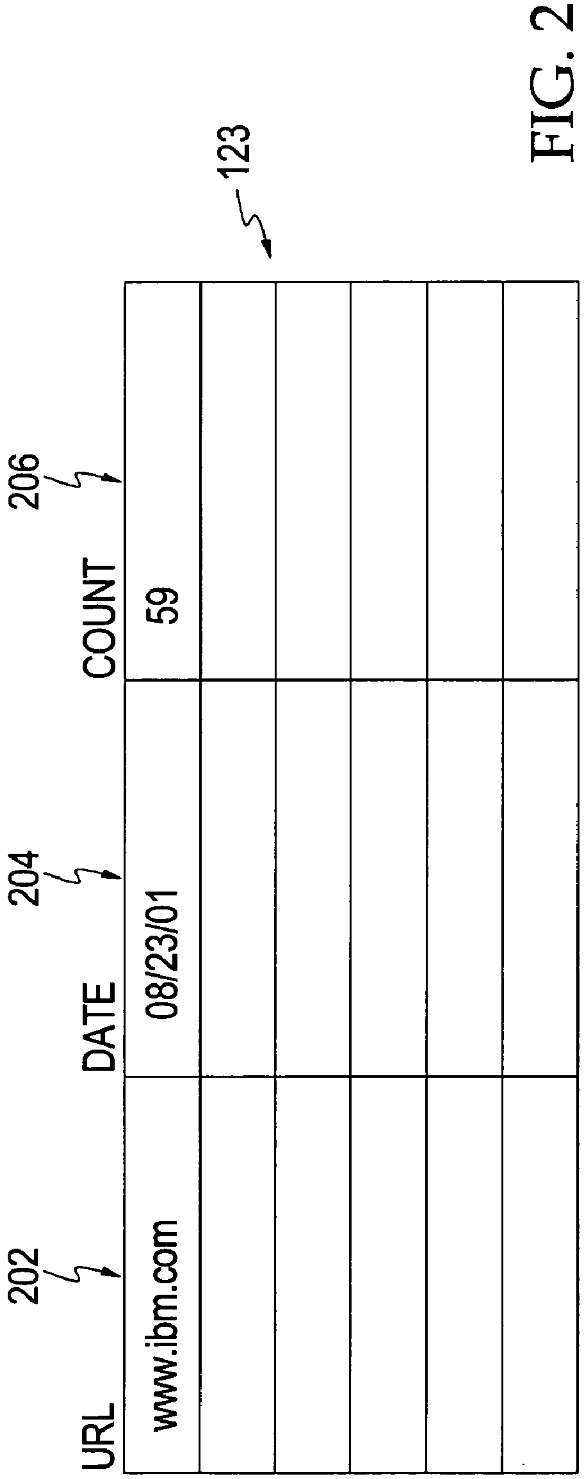
FIG. 2 is a data structure illustrating one embodiment of a visited list.

FIG. 2 is an embodiment of the visited list 123. Illustratively, the visited list 123 is implemented as a table organized as a plurality of rows and columns. The columns include a network address column 202, a date column 204 and a count column 206. The network address column 202 contains some format of a network address which is accessed by the browser program 140. In a particular embodiment, the network address may be formatted as a uniform resource locator (URL). The entries of the date column 204 contain the date on which the respective network address of a row was accessed. The number of times a particular network address has been accessed is indicated by a value in the count column 206. A row, or record, of the visited list 123 is created when a network address is visited for the first time. Thereafter, when the same network address is revisited at a later time, the respective count value contained in the count column 206 is incremented.

Figure 3:
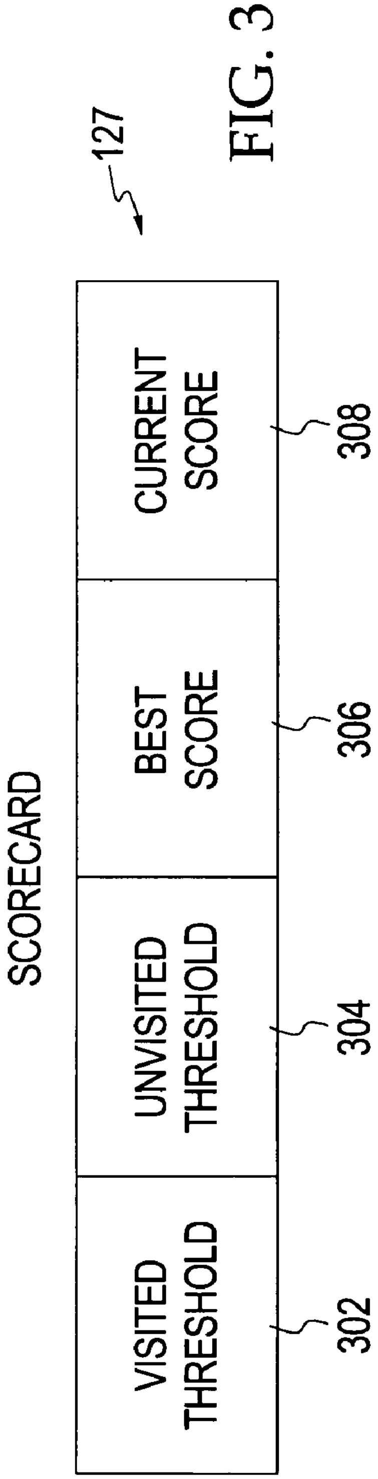
FIG. 3 is a data structure illustrating one embodiment of a score card.

FIG. 3 is an illustrative embodiment of the scorecard 127. The scorecard 127 comprises a plurality of entries including a visited threshold entry 302, an unvisited threshold entry 304, a best score entry 306 and a current score entry 308.

Figure 4:
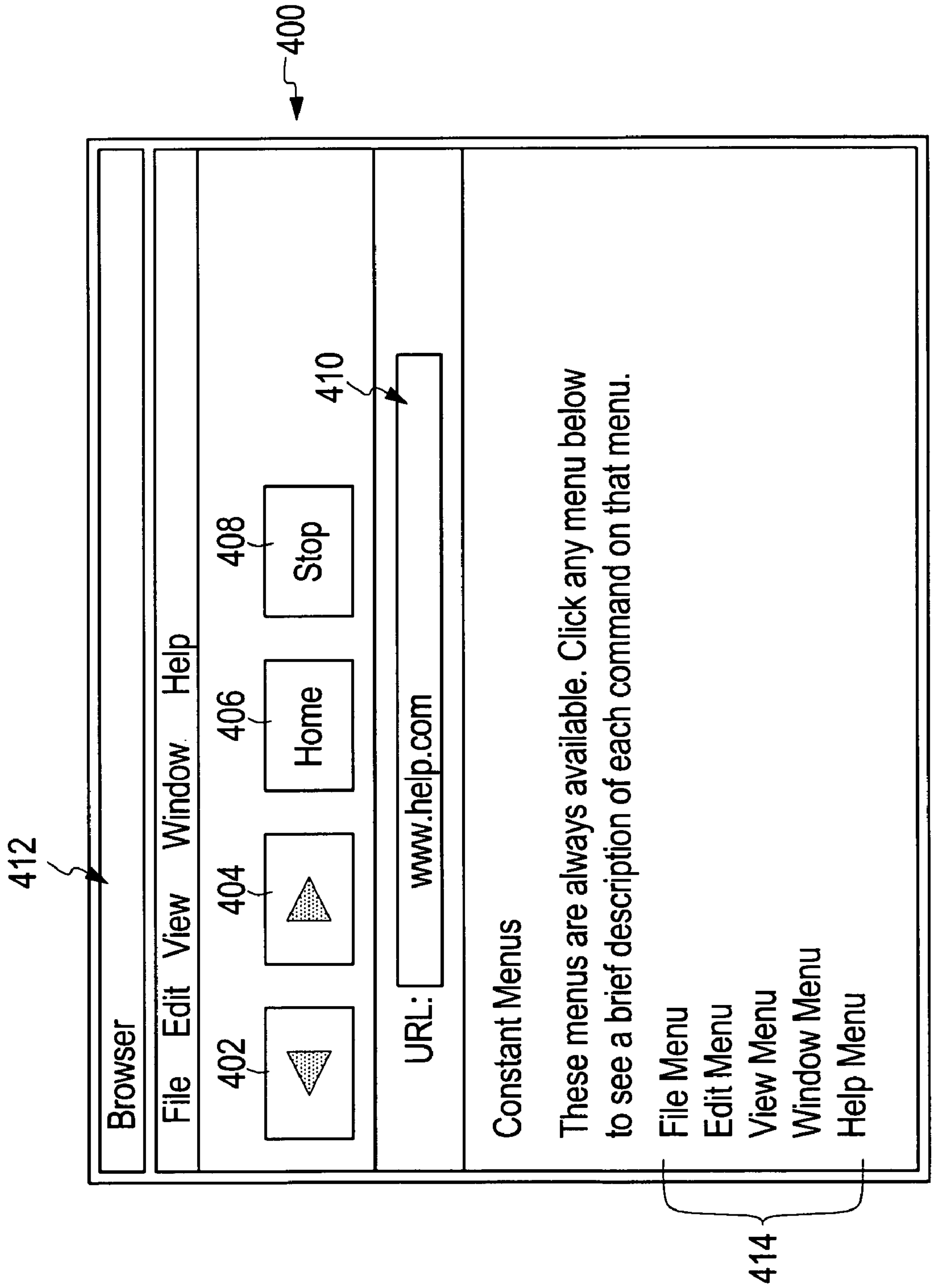
FIG. 4 is an illustrative browser window containing hyperlinks.

When executed during a browsing session, the dialog box positioning program 141 operates to control the positioning of a dialog box with respect to hyperlinks contained in a currently displayed electronic document. The controlled positioning implemented by the dialog box positioning program 141 may be illustrated with reference to FIG. 4 and FIG. 5. Referring first to FIG. 4, a browser window 400 is shown which is implemented by the browser program 140. In general, the browser window 400 is configured with well-known elements such as a Forward button 402, a Back button 404, a Home button 406, a Stop button 408, an address window 410, and a plurality of menu options 412. The currently displayed document is located at the network address www.help.com, as indicated in the address window 410. Because this address was accessed during the current browsing session, the network address www.help.com is now contained in the recent history folder 125. The address is also stored to the visited list 123 for long-term record keeping purposes. The contents of the currently displayed window include a plurality of hypertext links 414.

Figure 5:
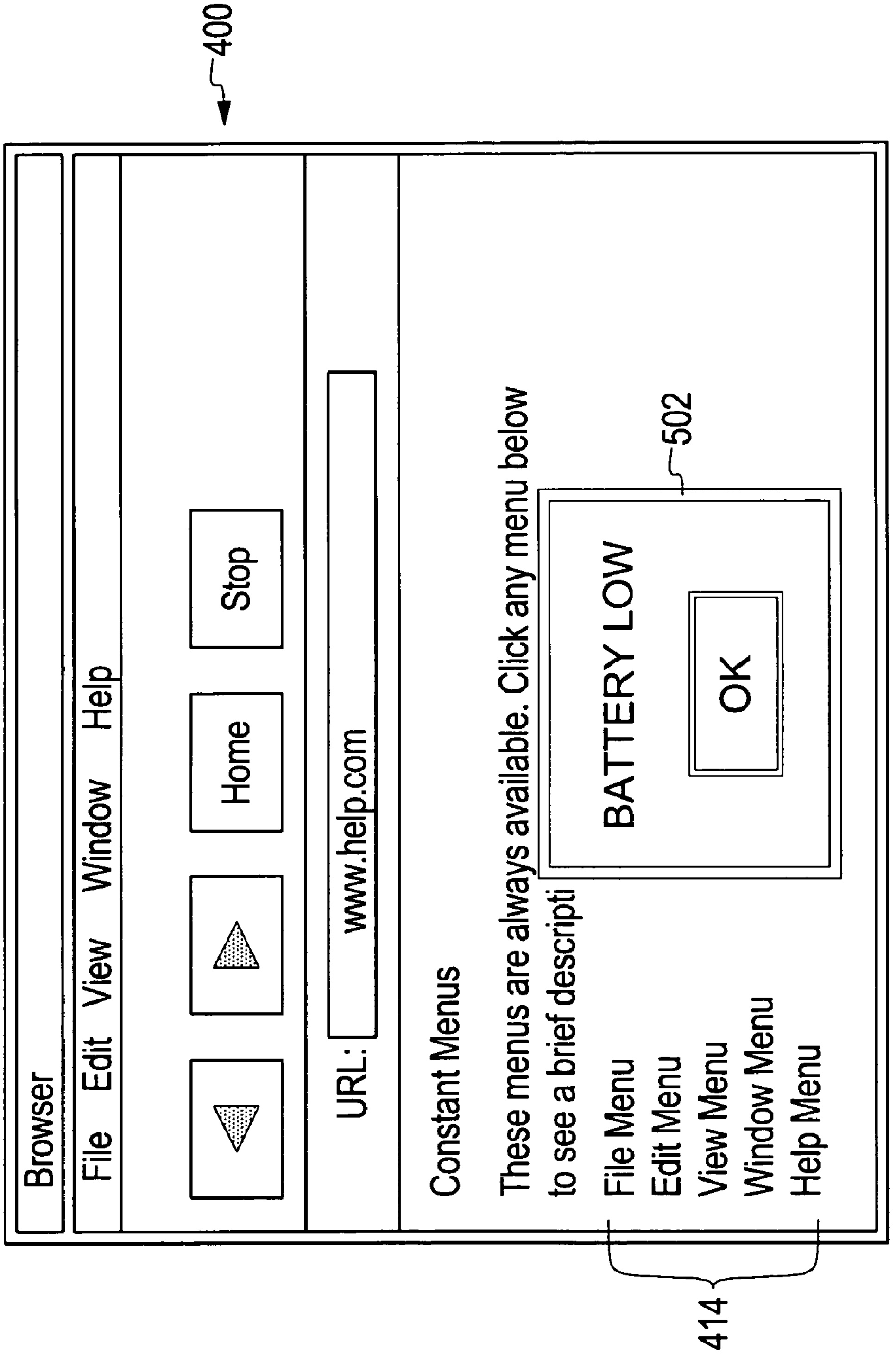
FIG. 5 is the browser window of FIG. 4 showing a dialog box positioned to avoid obstructing the hyperlinks.

Referring now to FIG. 5, the same browser window 400 is shown. However, a non-modal dialog box 502 is also shown in the window 400. In accordance with the present invention, the dialog box 502 has been positioned away from the hypertext links 414, thereby allowing the user to view and access links 414 without first interacting with the dialog box 502.

Figure 6:
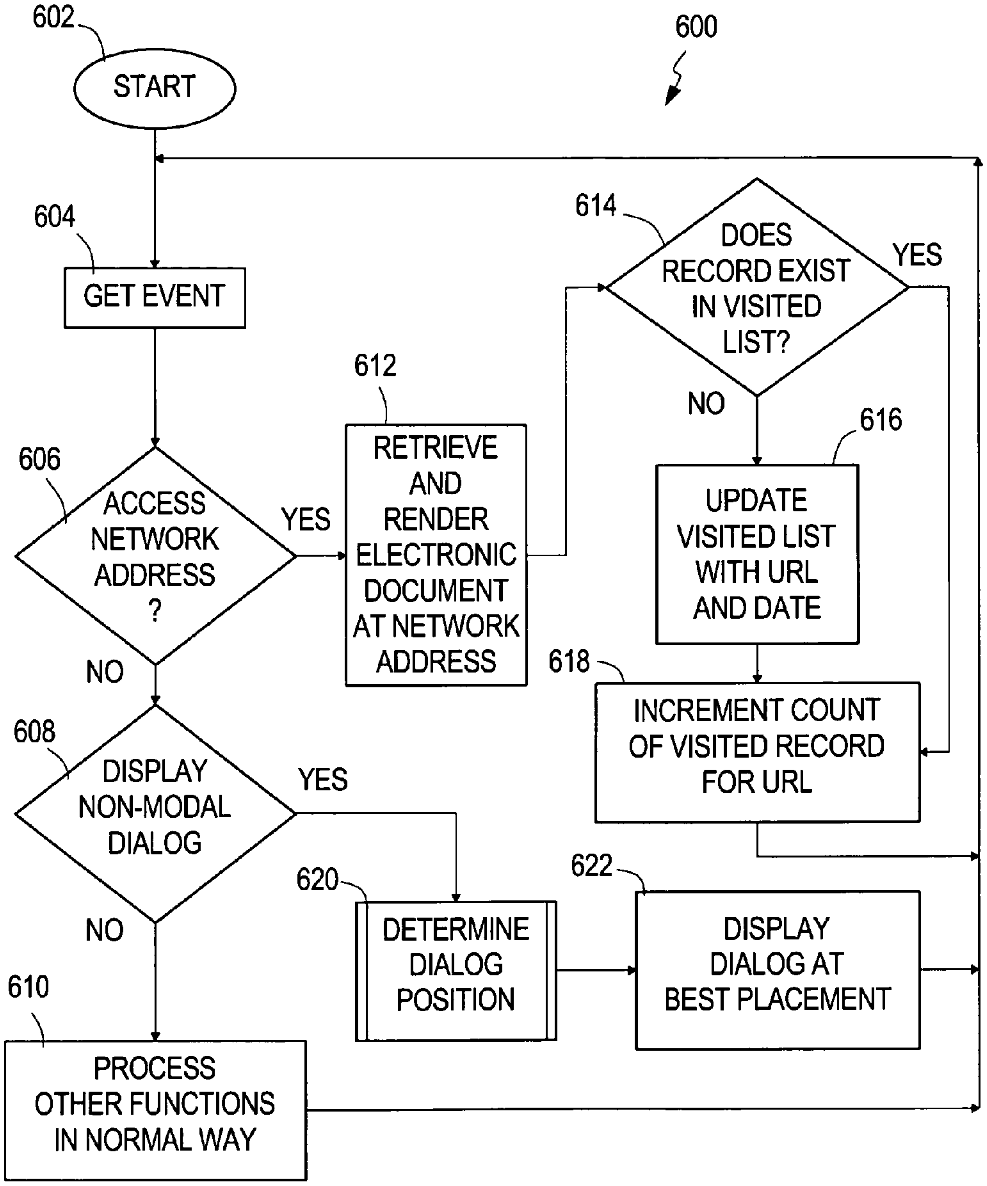
FIG. 6 is a flow chart illustrating one embodiment for browsing network addresses, rendering a page and positioning a dialog box.

One method 600 for implementing the dialog box positioning features of the present invention is described with reference to FIG. 6. The method 600 may be understood as the operations performed by the browser program 140 and/or the dialog box positioning program 141. The method 600 enters its step 602 and proceeds to step 604 to get an event. At step 606, the method 600 queries whether the event is to access a network address. If not, the method 600 proceeds to step 608 and queries whether the event is to display a non-modal dialog box. If step 608 is answered negatively, the event is handled at step 610 according to predefined rules of the client computer 122.

Returning to step 606, if the event is to access a network address, the electronic document located at the network address is retrieved and rendered at step 612. The method 600 proceeds to step 614 and queries whether a record exists in the visited list 123 for the network address accessed. If not, at step 616, the visited list 123 is updated with the network address (in column 202) and the current date (in column 204). From step 616, or from step 614 if answered affirmatively, the method 600 proceeds to step 618 where the count value (in column 206 of the visited list 123) for the network address is incremented. The method 600 then returns to step 604 to get another event.

Returning to step 608, if the event is to display a non-modal dialog box, the method 600 proceeds to step 620 to determine the dialog box position. At step 622, the dialog box is then positioned at the position determined at step 620. The method 600 then returns to step 604 to get another event.

The dialog box position may be determined at step 620 by any of a variety of methods. In one embodiment, the dimensions of the dialog box are ascertained and then an appropriate area of the displayed document is located. In this context, an appropriate area is any viewable area that does not contain hyperlinks. In another embodiment, steps are taken to avoid placing the dialog box over links which are most likely to be selected by the user. If the box cannot be positioned to avoid obscuring all links most likely to be selected, then the box is positioned to minimize the number of such links obscured. The likelihood of a link being selected may be determined, for example, by examining the navigation path of the user. In a particular embodiment, the navigation path may indicate an emphasis on a particular subject matter (e.g., travel, pets, toys, finances), in which case it would be desirable to avoid placing the dialog box over links related to the subject matter. A concentration on a subject matter may be indicated by the most recent search query that the user input during the present session. A concentration on a subject matter may also be indicated by related content of some number of the immediately preceding pages. In a different embodiment, the navigation path may indicate that the user is traversing previously visited links, in which case it would be desirable to avoid placing the dialog box over the previously visited links of the current page. In any case, a weight may be accorded to the links in order to differentiate the links believed to be more likely selected from those less likely to be selected. The dialog box is then placed in a location at which the cumulative weight is least, for example.

Figure 7:
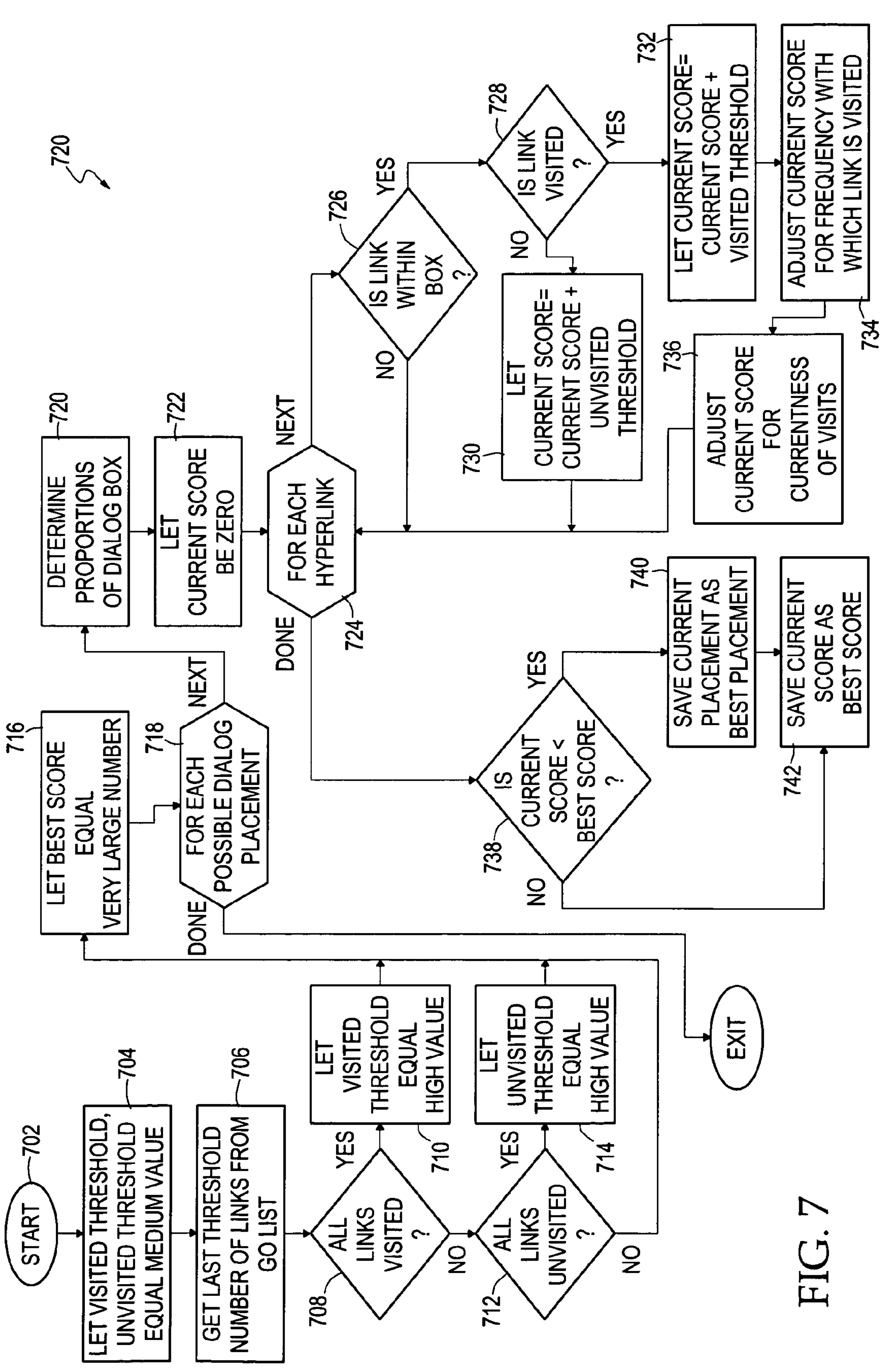
FIG. 7 is a flow chart illustrating one embodiment for determining a position of a dialog box relative to hyperlinks.

FIG. 7 shows a method 700 illustrating one embodiment for determining the dialog box position at step 620 of method 600 described above. The method 700 is entered at step 704 where a Visited Threshold (contained in entry 302 of the scorecard 127) and an Unvisited Threshold (contained in entry 304 of the scorecard 127) are set equal to a medium value. At step 706, a predetermined number of links traversed in the current browser session is retrieved from the recent history folder 125. The method 700 then proceeds to step 708 and queries whether the links retrieved at step 706 are all previously visited links. That is, a determination is made as to whether the count value (contained in the count entry 206 of the visited list 123) for each respective link is at least two (2). If step 708 is answered affirmatively, the Visited Threshold is set equal to some high value at step 710. The method 700 then proceeds to step 716 where the Best Score (contained in the entry 306 of the scorecard 127) is set to some very large number. If, however, step 708 is answered negatively, the method 700 proceeds to step 712 and queries whether all the links retrieved at step 706 are unvisited. If not, the method 700 proceeds directly to step 716. If step 712 is answered affirmatively, the Unvisited Threshold is set equal to the high value at step 714. Thereafter, the method 700 proceeds to step 716.

From step 716, the method 700 enters a loop at step 718 for each possible dialog box placement within the current browser window. The possible placements for the dialog box may be determined according to a particular implementation. In one embodiment, a first iteration of the loop beginning at step 718 is performed for a dialog box placement in the upper left-hand corner of the browser window. For each subsequent iteration, the dialog box is moved to the right to some number of pixels. When the dialog box reaches the upper right hand corner of the browser window, the box is moved down some number of pixels and then moved to the left some number of pixels for each iteration of the loop beginning at step 718. This process may be repeated until the entire screen area has been examined for possible placement of the dialog box. It should be noted that the particular number of pixels the dialog box is moved each iteration (i.e., the granularity of movement) is not limiting of the present invention and may be varied for different embodiment. Further, the measurement for the location of the dialog box at each iteration need not be a number of pixels and may be some other measurement.

At step 720, the proportions of the dialog box are determined. At step 722, the Current Score is set to zero. The method 700 then enters a loop at step 724 for each hyperlink within the browser window. At step 726, the method 700 queries whether the hyperlink is within the dialog box. That is, a determination is made as to whether the hyperlink is obscured from the view of the user by the present location of the dialog box. If not, the method 700 returns to step 724 to begin processing the next hyperlink. Otherwise, the method 700 proceeds to step 728 and queries whether the link has been previously visited (i.e., whether the count value for the link is at least one (1)). If not, at step 730, the Current Score is set equal to the Unvisited Threshold plus the Current Score determined during the previous iteration of the loop beginning at step 724. In the case of the first iteration, the Current Score is zero (as set at step 722). The value of the Unvisited Threshold at step 730 is either the medium value set at step 704 or the high value set at step at 714. The method 700 then returns to step 724 to begin processing the next hyperlink.

If the query at step 728 is answered affirmatively, the method proceeds to step 732 where the Current Score is set equal to the Visited Threshold plus the Current Score of the previous iteration of the loop beginning at step 724. Again, in the case of the first iteration, the Current Score is zero. The value of the Visited Threshold is either the medium value set at step 704 or the high value set at step 710.

In one embodiment, the method 700 returns from step 732 to step 724 to begin processing the next hyperlink. In another embodiment, the Current Score is adjusted for the frequency with which the hyperlink is visited and/or the date(s) on which the link was visited. Thus, in the embodiment illustrated in FIG. 7, the method 700 proceeds to step 734 where the Current Score is adjusted for the frequency with which the link is visited. In one embodiment, the Current Score is adjusted according to the following equation:

$$\text{Current Score} = \text{Current Score (of previous iteration)} + (\text{Count}/\text{Adjustment Threshold}) \qquad \text{Equation 1}$$

In this case, the count is the value retrieved from the appropriate entry of the count column 206 of the visited list 123 (i.e., the count entry of the record of the link currently being processed). The Adjustment Threshold is some value which may be determined according to implementation. In one embodiment, the Adjustment Threshold is greater than zero (0) and less than or equal to one (1). Thus, the smaller the Adjustment Threshold, the more weight is given to the count.

From step 734, the method 700 proceeds to step 736 where the Current Score is adjusted for the currentness of visits using the date information in the date column 204 of the visited list 123. This adjustment may be desirable because sites which were once frequently visited, and thus have a high count value, may no longer be important to a user. As such, relying on the count value alone may produce an undesired positioning of the dialog box. Although shown separately, step 734 and 736 may be combined into a single step. For example, the Adjustment Threshold may be selected using the date information. Thus, in the case of a relatively recent date in the date column 204, a relatively lower Adjustment Threshold may be assigned; while in the case of a relatively old date, a relatively higher Adjustment Threshold may be assigned. The method 700 then returns to step 724 to begin processing the next hyperlink.

Once each of the hyperlinks in the browser window have been processed, the method 700 proceeds to step 738 and queries whether the Current Score is less than the Best Score. In the first iteration of the loop entered at step 724 this query will necessarily be answered in the affirmative due to the very large number assigned to the Best Score at step 716. Accordingly, the method 700 proceeds to step 740 to save the current placement of the dialog box as the best placement. At step 742, the Current Score is saved as the Best Score. The method 700 then returns to step 718 to begin processing the next dialog box position. The foregoing processing is then repeated for each dialog box position and results in a best placement at the location having the lowest Current Score. By assigning a high value to one of the Visited Threshold and Unvisited Threshold, the method 700 attempts to produce a result in which the dialog box is positioned over unvisited links (or at least primarily over unvisited links) in the former case and over visited links (or at least primarily over visited links) in the latter case. Once each of the possible placements has been examined, the method 700 exits at step 744 and proceeds to step 622 of FIG. 6 where the dialog box is positioned.

While the foregoing is directed to embodiments of the present invention, other and further embodiments of the invention may be devised without departing from the basic scope thereof, and the scope thereof is determined by the claims that follow.

What is claimed is:

1. A method of positioning a non-modal dialog box in a graphical user interface (GUI) displaying content comprising hyperlinks, the method comprising:

determining whether the GUI includes a display area at least equal to an area of the non-modal dialog box and absent of any hyperlinks; and if so, displaying the non-modal dialog box in the display area.

2. The method of claim 1, wherein the content comprises Web content and the GUI comprises a browser interface.

3. A method of positioning a non-modal dialog box in a graphical user interface (GUI) displaying content comprising hyperlinks, the method comprising:

processing a request to retrieve the content from a network address;

parsing a response to the request;

rendering the content in a viewable manner;

determining a position for the non-modal dialog box, wherein the determining comprises at least one of:

(i) determining whether the non-modal dialog box can be positioned in a display area of the GUI where none of the hyperlinks are obscured from a view of a user; and (ii) determining whether the non-modal dialog box can be positioned in a display area of the GUI where a least number of hyperlinks are obscured from the view of the user; and displaying the non-modal dialog box in the position.

4. The method of claim 3, wherein determining the position further comprises comparing an area of the non-modal dialog box with the display area.

5. A computer readable storage medium containing a program which, when executed by a processor, causes operations to position a non-modal dialog box in a graphical user interface (GUI) displaying content comprising hyperlinks, the operations comprising:

determining whether the GUI includes a display area at least equal to an area of the non-modal dialog box and absent of any hyperlinks; and if so, displaying the dialog box in the display area.

6. The computer readable storage medium of claim 5, wherein the content comprises Web content and the GUI comprises a browser interface.

7. A computer readable storage medium containing a program which, when executed by a processor, causes operations to position a non-modal dialog box in a graphical user interface (GUI) displaying content comprising hyperlinks, the operations comprising:

processing a request to retrieve the content from a network address; parsing a response to the request;

rendering the content in a viewable manner;

determining a position for the non-modal dialog box, wherein the determining comprises at least one of:

(i) determining whether the non-modal dialog box can be positioned in a display area of the GUI where none of the hyperlinks are obscured by a user; and (ii) determining whether the non-modal dialog box can be positioned in a display area of the GUI where a least number of hyperlinks are obscured from the view of the user; and displaying the dialog box in the position.

8. The computer readable storage medium of claim 7, wherein determining the position further comprises comparing an area of the non-modal dialog box with the display area.

* * * * *

UNITED STATES PATENT AND TRADEMARK OFFICE

CERTIFICATE OF CORRECTION

PATENT NO. : 7,594,186 B2
APPLICATION NO. : 11/128797
DATED : September 22, 2009
INVENTOR(S) : Bates et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1093 days.

Signed and Sealed this

Twenty-eighth Day of September, 2010

David J. Kappos

*Director of the United States Patent and Trademark Office*